SPINNING HEAD WITH PLURAL NOZZLES

Filed April 30, 1962

7 Sheets-Sheet 1

Inventors
Hans-Joachim Dietzsch
Otto Dietzsch
By Watson, Cole, Grindle & Watson
Attys Jnventors
Hans-Joachim Dietzsch
Otto Dietzsch
By
Watson, Cole, Grindle & Watson
Attys

SPINNING HEAD WITH PLURAL NOZZLES

Filed April 30, 1962 7 Sheets-Sheet 3

Inventors
Hans-Joachim Dietzsch
Otto Dietzsch
By Watson, Cole, Grindle & Watson
Attys.

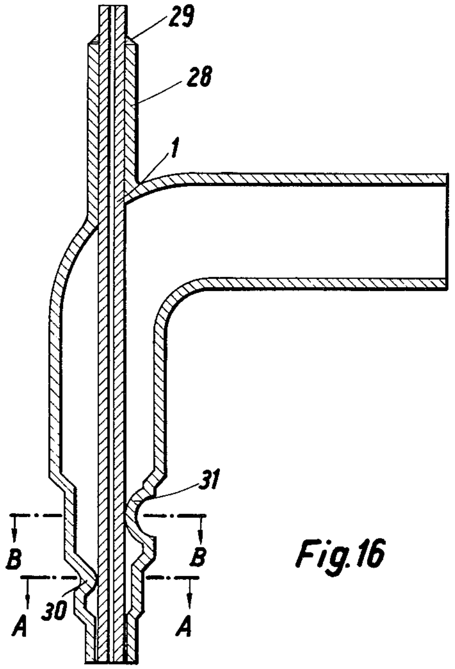
Fig.16
AA Fig.17
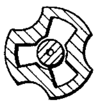
BB Fig.18
Inventors
Hans-Joachim Dietzsch
Otto Dietzsch
By Watson, Cole, Grindle + Watson
Attys.

Jnventors
Hans-Joachim Dietzsch
Otto Dietzsch
By
Watson, Cole, Grindle, Watson
Attys.

SPINNING HEAD WITH PLURAL NOZZLES

Filed April 30, 1962 7 Sheets-Sheet 6

Inventors
Hans-Joachim Dietzsch
Otto Dietzsch
By Watson, Cole, Grindle & Watson
Attys.

SPINNING HEAD WITH PLURAL NOZZLES

Filed April 30, 1962 7 Sheets-Sheet 7

Jnventors
Hans-Joachim Dietzsch
Otto Dietzsch
By
Watson, Cole, Grindle + Watson
Attys.

United States Patent Office 3,197,812
Patented Aug. 3, 1965

3,197,812

SPINNING HEAD WITH PLURAL NOZZLES

Hans-Joachim Dietzsch, Chemin de Bonne Esperance 10, Lausanne, Switzerland, and Otto Dietzsch, Degerfeld 642, Stein am Rhein, Germany Filed Apr. 30, 1962, Ser. No. 190,852
8 Claims. (Cl. 18—8)

Figure 1:
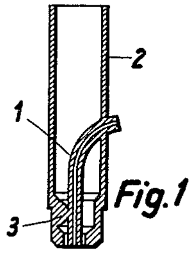

This invention relates to spinning heads with multiple nozzles inserted in the nozzle bottom for use in producing composite synthetic filaments, in particular threads.

The invention resides in an improved spinning head with individual multiple nozzles inserted in the nozzle bottom part consisting of a core nozzle and at least one annular nozzle surrounding the latter and with separate feeding spaces or compartments for the material to be spun applicable to the individual stages of the multiple nozzles. The multiple nozzles can be easily renewed and packed by a special arrangement of the feeding spaces. In addition the invention provides further improvements which are made possible by the special feeding space arrangement, such as, for example, the introduction of additional devices for the precise centering of the inside tubes and anchoring against lateral displacement, and of special short distance heating means for the outlet regions and regulating means for the flow across sections of the nozzle tubes.

By the term "production for the spinning art" is to be understood all plastic art skein making processes (such as pressing, spraying, spinning). For that reason the term "filaments" is to include besides textile fibers, also coarser structures such as tubing or cables, or also thread-like individual elements which directly after their production are to be united in a block.

It is known to construct spinning heads for composite synthetic filaments, in particular threads, in such a way that a plurality of multi-stage individual nozzles are inserted in a plate-like closure of the spinning head designated as nozzle bottom, through which the material to be spun issues from the spinning head. In this case heretofore there lay on this plate-like nozzle bottom of the spinning head first the feeding space for the spinning material producing the external jacket or of the filament, and the further feeding spaces (containing the materials for the production of those parts of the final filament which, with respect to the cross-section of the filament, are nearer to the longitudinal axis of the filament) are arranged further away from said plate-like nozzle bottom beyond said first feeding space and separated from said first feeding space and from one another by each individual partition.

Therefore the feeding space or compartment furnishing the external component substance, seen in the direction of flow of the spinning operation, is back of the feeding spaces furnishing the internal component substances, that is, therefore, placed at the bottom of the nozzle. According to experience this had as a consequence many disadvantages. The feeding space for the external filament surface located at the bottom of the nozzle is in fact under high temperature and very high pressure. The packing of the multiple nozzles can therefore be effected only metallically, and in the installation and removal of the complicated multiple nozzles they are very easily damaged, which removal is necessary occasionally for repair and cleaning purposes and can be carried out only under great difficulties.

Also it is necessary for the production of hollow filaments that the gas feeding space if, as hitherto usual, it is located between the conveying means of the spinning machine, on the one hand, and the spinning feeding space at the bottom of the nozzle, on the other hand, it must be packed carefully against these two pressure chambers conveying the mass material to be spun.

To be sure it is already known in the case of multi-stage individual nozzles to pass the core tube through the covering or jacketed tube of the annular nozzle surrounding the core tube. However such inverse multiple nozzles have not yet been called upon to solve the problem above described.

In contrast hereto the spinning head according to the invention is provided with multiple nozzles inserted in the bottom of the nozzle and consisting of a core nozzle and at least one annular nozzle surrounding the latter, and with separate feeding spaces for the material to be spun as to the individual stages of the multiple nozzles. With the use of inverse multiple nozzles in which in a manner known per se the core tube is directed outwardly through the covering tube of the annular nozzle, joins directly the feeding space as to the core nozzles at the bottom of the nozzle, so that the feeding spaces for the annular nozzles are separated from the nozzle bottom by the feeding space for the core nozzles.

The insertion of such inverse multiple nozzles in the spinning head containing the feeding spaces is effected either with the use of solder or by means of packing, preferably by compressible packing. This attachment of the multiple nozzles is effected preferably in the partition between the feeding spaces for the annular nozzle and the core tube and is suitably constituted by soldering, in particular, with the interposition of a sleeve.

In the case of the spinning space arrangement according to the invention with the use of inverse multiple nozzles, there is obtained a considerable advantage. The feeding space which lies at the bottom of the nozzle requires a packing against the outside atmosphere. As the gas feeding space or compartment is practically under a slight pressure it is now possible to pack the inverse multiple nozzles in the nozzle bottom limiting plate between the gas feeding compartment and the free atmosphere, just by a sliding seat. The packing may be reinforced or replaced by a cone or a flange attached to the individual nozzle which rests on the limiting plate, contingently with interposition of a packing, for example, a packing of silicone rubber.

In accordance with the invention it is also possible to join together in a group, a plurality of inverse multiple nozzles by constructing their jacket or covering tubes as a common covering tube for a group of core tubes and to solder or pack this multiple nozzle group in the spinning head. As an extreme case of this construction there results a spinning head-nozzle body which consists merely of inverse multiple nozzles assembled in groups in this manner. The construction of the covering tubes for a group of inverse individual nozzles is advantageously effected according to the methods of compound nozzle making which are the object of a German Patent No. 1,047,984.

The formation of the core nozzle or core nozzle group at the wall of the covering or jacket tube or tubes of an inverse multiple nozzle is effected, for example, by bending at least one of these tube groups. If the core nozzle tube, or the core nozzle tube inside bundle, remains straight then suitably the jacket tube is given an S-shaped form. Thereby the inverse multiple nozzle becomes elastic and acquires the possibility of equalizing differences in length between the upper and lower limiting surfaces and contingently even a certain contact pressure on the lower limiting surface of the gas feeding space by a flange or cone located on the inverse multiple nozzle.

If inverse multiple nozzles are used with a straight jacket tube, then the core nozzle tube or the core nozzle tube bundle, can be bent. Preferably the inner gas conducting core nozzle tubes are provided with filter caps which prevent a fouling of the core nozzles.

It has proven to be particularly advantageous to attach tubular props to the wall of the jacket or covering tube which serve for supporting and guiding the core nozzle tubes. The packing of the core nozzle tubes may also in this case consist of a soldered connection. The secure supporting of the core nozzle tubes by tubular props also makes it possible to construct the jacket tubes in two parts, namely a nozzle inlet part carrying the tubular prop constructed as the affixed part, for example, apart from the nozzle outlet section, and a nozzle outlet part, for example, constructed as the push-in part centering the core nozzles. Such a form of the multiple nozzles facilitates quite essentially their cleaning and repair, and it is surprising that even in the case of quite small embodiments, such as are necessary for the making of artificial silk filaments, such simple measures are sufficient to insure the necessarily precise mode of operation.

On account of the occurrence of different surface tensions in the case of unequally thick covering surfaces and the tearing of the hollow filament, caused thereby particularly high demands are made for the exact centering of the core nozzle tubes in the jacket or covering tubes. It is insured in the region a short distance before the nozzle outlet openings of the core tubes by burl-like centering elevations, arranged with intervals for the flow of the material to be spun, projecting into the interior, of the inside surface of the nozzle tubes. For the making of such nozzle forms with centering bridges in the annular channels, a process has been found to be particularly advantageous as described in the German Patent No. 1,047,984, in which the centering elevations projecting inward are made by having a negatively produced counter mold body destroyed, for example dissolved, by chemical or physical action. For instance the negative counter mold body is made from aluminum and this is electrolytically coated with a thick layer of hard nickel. Thereafter the aluminum can be dissolved out by means of a caustic soda solution. There is also the possibility of applying the external layer, forming the actual nozzle body, by soldering, that is metallurgically, and in the form of molten metal on the counter mold body. For example the latter can be made of iron, and coated with a gold-platinum soldered layer by fusion and the iron body then dissolved out by means of an acid. It is also conceivable that reinforcing bodies such as wires, bands or even sheet metal or tubular pieces can be embedded in the material layer of the actual nozzle body. The centering elevations formed by this method of production have the peculiarity that they support the core tubes not only in the centered position but they anchor them therein. By the shaped fitting of the contact points of the centering elevations with the inside nozzle tubes, adhesion is obtained. The core tubes are therefore not only supported on the centering bridges but connected therewith because the contact is effected not only at points or lines but by a closely fitting laminar surface contact for an extensive area of the surface of the inside tube. As a special case of such an adhesive anchoring surface contact there results in this procedure a direct growing together of the materials of the centering elevations and of the centered nozzle tubes and that, of course, then the production of the centering elevations is effected by fusing, vaporizing, electrolytic formation or the like.

It has been proven to be particularly advantageous to so construct the spinning head according to the invention that in making the centering, elevations are first produced at such an extent that they can merely center an internally placed nozzle body of smaller dimension than is required. They are therefore constructed too high in the direction of the axis of the core nozzle. Subsequently, then, after removal of the counter mold body at the time by chipping or by shaping without chipping the inside diameter between the centering, the elevations are widened, so that the actual nozzle part can be pushed in with a fitted seat. In particular the counter mold body is so constructed for this purpose that for this subsequent widening of the inside diameter between the centering elevations, a type of boring bush is formed in the production of the actual nozzle body which subsequently is cut off from the actual nozzle body.

The multiple nozzles may, therefore, consist of individual parts pushed into one another, contingently capable of being separated again or even of a compact nozzle, and the centering bridges thereof in the region before the nozzle outlet may be positively supporting by a homogeneous material.

For the production of filaments of three or more inverse components, multiple nozzles can be produced in the same way according to the methods described in the foregoing.

In this connection there will be described a further advantage of the spinning head according to the invention, namely a special method of production for filaments which is made possible with the aid of a special embodiment of of the spinning head with inverse multiple nozzles according to the invention.

In the production of filaments, in particular fibers and threads, from several components, it has been established that in general the spinning substances analogously to the different qualities demanded of them by the finished fiber also have different specific and most favorable spinning temperatures. For example, the fusion spinning of a polyester fiber encased with a polyamide resin jacket would require for the two components a temperature difference of more than 20°. Therefore the simultaneous spinning of several substances is often difficult since they must be conveyed to one another with uniform temperature for a long distance to the nozzle opening. This is always true if the spinning temperature which is required for the component with the highest spinning temperature already damages another component. Now it was found that most spinning substances which must be spun in heated condition (in particular those which are fusion spun or those which are spun in a heated solution) can be brought for a short time to a higher temperature without injury which would normally be expected. For a short time they must be brought to that higher temperature which corresponds to the normal spinning temperature of that substance which has the highest spinning temperature of all substances to be spun simultaneously for a multi-component filament.

In evaluation of this knowledge accordingly a particularly preferred embodiment of the spinning head of the invention was created in which inverse multiple nozzles are provided which have a heating device in the vicinity of the nozzle outlet. In the case of such spinning separate feeding spaces or compartments, the different spinning components are conveyed in relatively highly viscous state, which does not have to correspond absolutely to the spinning viscosity, into the individual nozzles attached to these feeding spaces. The individual components preformed by the individual nozzles are, in the immediate vicinity of their nozzle outlet, heated for a short time by the additional heating means to the spinning temperature which corresponds to the normal temperature of that substance which has the highest spinning temperature of all the substances to be spun simultaneously.

As the flow of the spinning masses is effected comparatively rapidly the nozzle outlet heating means, which in principle is a short stretch heating, may extend for a length of about 1 to 10 mm. along the jacket tube. The additional heating may advantageously be accomplished by electric resistance heating. The feeding spaces or compartments, which specifically may be constructed as tubes arranged vertically to the feed pipes for the inverse multiple nozzles, may obviously likewise be heated with additional devices and be heat insulated with their feed pipes to the nozzles.

To furnish the feeding compartments each with a spinning component there is an extruder advantageously attached to each of the feeding compartments or spaces. In that way also by melting the bar material the viscous spinning component can be produced with its requisite delivery pressure.

For the making of multi-component glass filaments, in particular hollow glass filaments, the inverse multiple nozzles are advantageously made of platinum or rhodium. The melting of the glass flux is effected here advantageously by the method described above.

In the case of the use of spinning heads according to the invention for the making of hollow filaments, disturbances occasionally occurred which could be attributed to the fact that probably at the nozzle outlet backflows into the gas feeding core nozzle occur. In any case it was discovered that these disturbances in operation can be avoided if core nozzles with an internal flow resistance which is carefully adapted to the material to be spun are used. To that end it is possible from the outset to choose core nozzles so that they will have the adjusted flow cross section. However it has proved to be particularly suitable to provide the core nozzles, for the purpose of regulating the feeding pressure in the case of gaseous media, with inserted bodies constricting the channel cross section. The inserted bodies which may consist of a hollow needle or of one or more wires, for example, profile wires, with an upper holding device, for instance a band, a flange or a square wire, and which are renewable from the nozzle inlet opening and hang loosely in the nozzle.

Such inserted bodies or fillers which do not completely fill the cross section of the nozzle but nevertheless are fitted in a jamming manner in the nozzle have proven completely satisfactory for example, fitted in hollow needles or profile wires, and particularly having triangular cross sections. Such inserted bodies need no special upper holding device, such as for example abutments or curved surfaces but they jam firmly in consequence of their length and natural elasticity with a rigidity sufficient for the spinning process. This has the special advantage that such inserted bodies may also be replaced from the nozzle outlet side.

Figure 2:
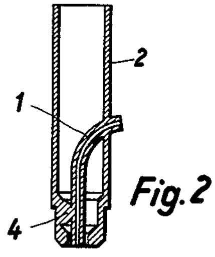
Figure 3:
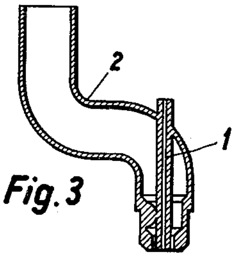
Figure 4:
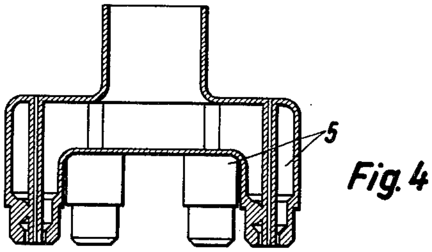
Figure 5:
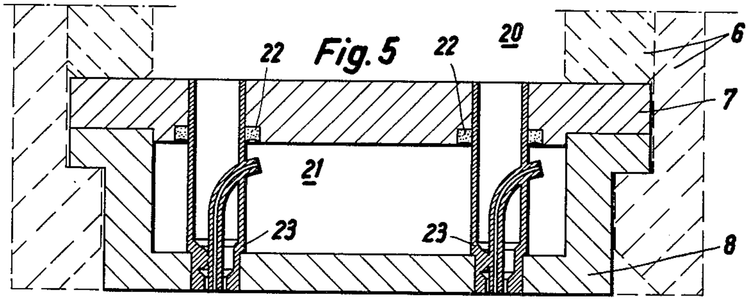
Figure 6:
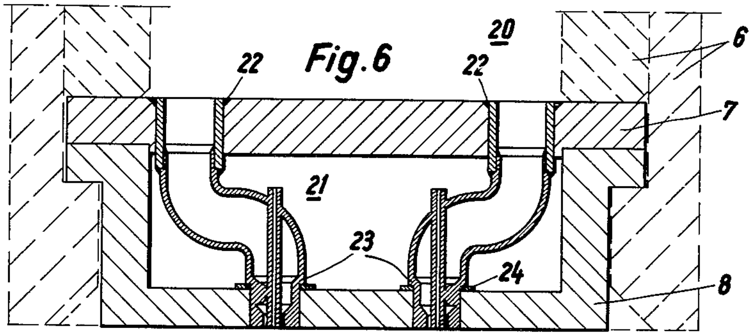
Figure 7:
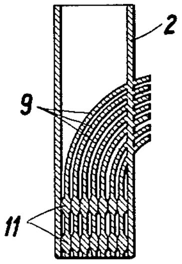
Figure 8:
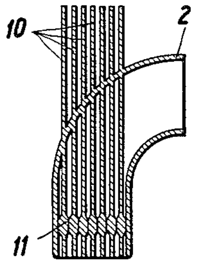
Figure 9:
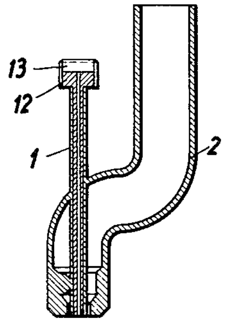
Figure 10:
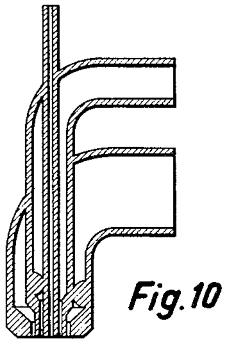
Figure 11:
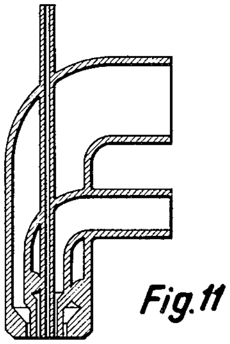
Figure 12:
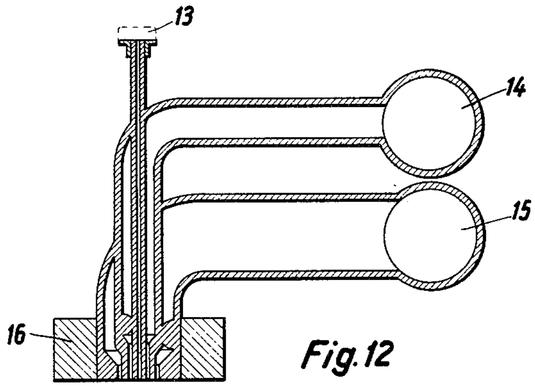
Figure 13A:
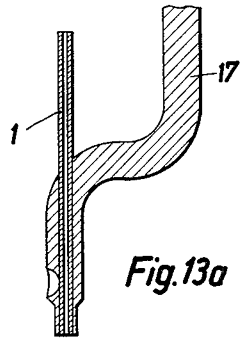
Figure 13B:
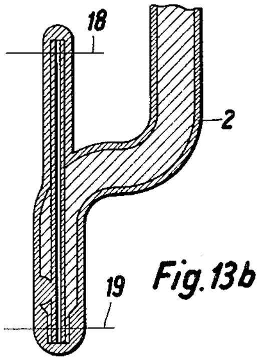
Figure 14A:
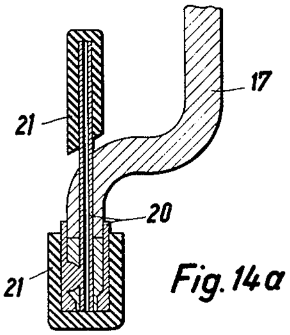
Figure 14B:
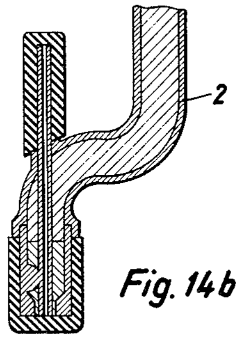
Figure 15A:
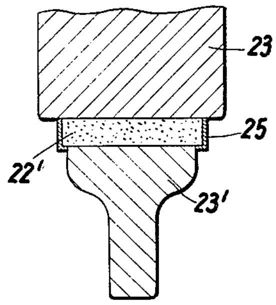
Figure 15B:
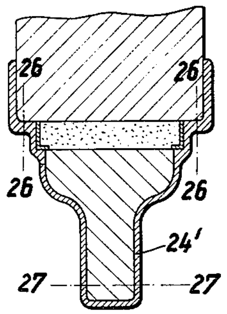
Figure 19:
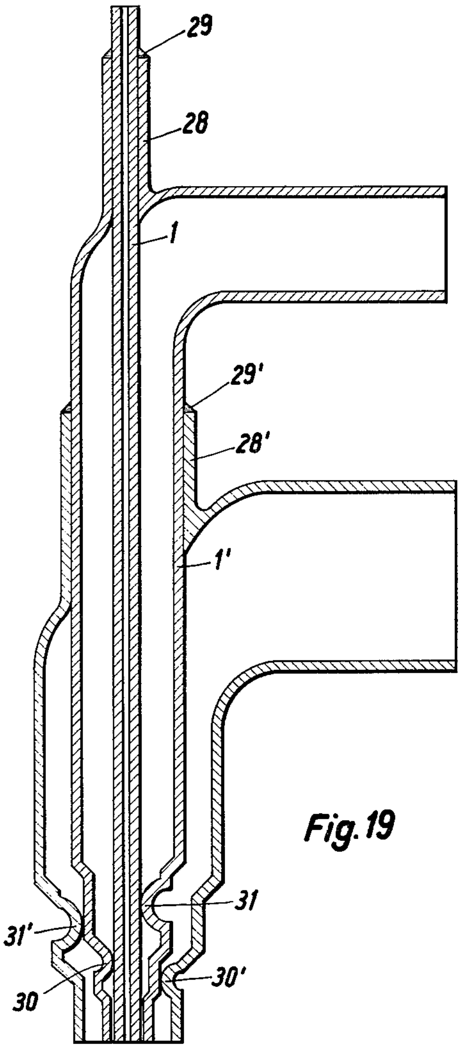
Figure 20:
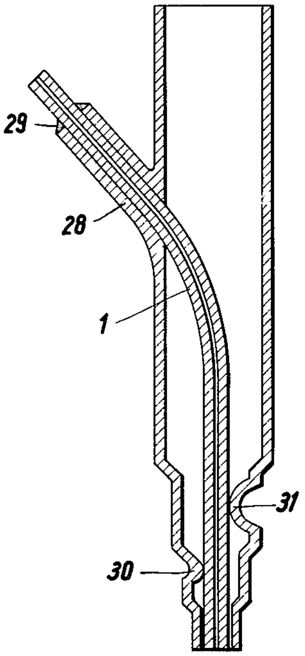
Figures 21A, 21B, 21C:
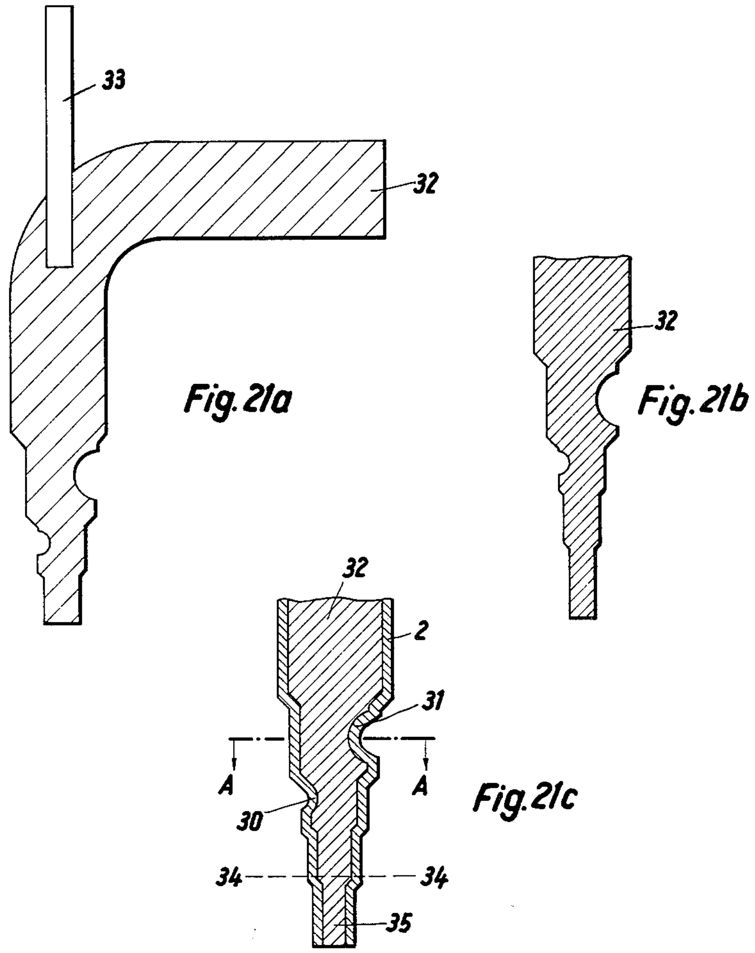
Figures 22A, 22B, 22C:
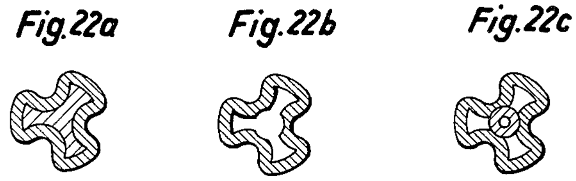
Figure 23:
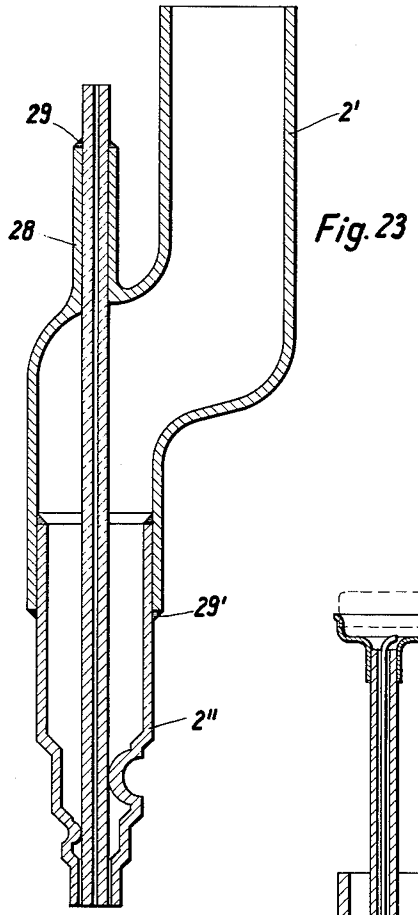
Figure 24:
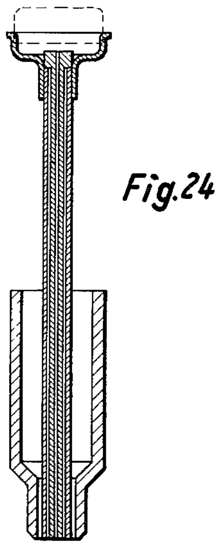
Figure 25:
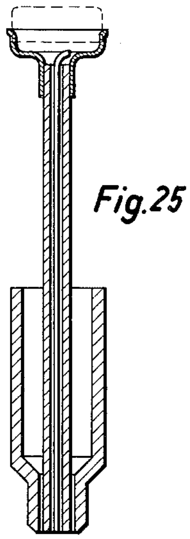
Figure 26:
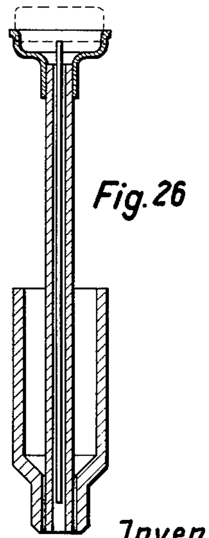

Further objects of the invention will be apparent from the following description when considered in connection with the accompanying drawings in which:

FIGURES 1 and 2 are sectional views of two inverse double nozzles with curved core and straight jacket tube, FIGURE 3 is a sectional view of a similar multiple nozzle with different centering means, FIGURE 4 is a sectional view of a complete multiple nozzle formed by uniting several inverse multiple nozzles, FIGURES 5 and 6 are sectional views of a spinning head inserted in a screw thread connection with two multiple nozzles inserted in each and showing two different constructions and different methods of insertion, FIGURE 7 is a sectional view of an inverse multiple nozzle with a plurality of core nozzle tubes and a common straight jacket tube, FIGURE 8 is a sectional view of an inverse multiple nozzle with several straight core nozzle tubes and a curved jacket tube (the latter shown only in the lower part), FIGURE 9 is a sectional view of an inverse multiple nozzle as in FIGURE 3 with an auxiliary capillary tube inserted in the core nozzle tube and provided with an upper packing collar and affixed filter cap, FIGURE 10 is a sectional view of an inverse triple nozzle, FIGURE 11 is a sectional view of another embodiment of a triple nozzle, FIGURE 12 is a sectional view of a triple nozzle as in FIGURE 10 with affixed filter cap and with connections to two feeding spaces adjacent to one another of tubular form with diagrammatically shown nozzle mouth heating, FIGURES 13*a* and 13*b* are sectional views of two successive structural stages in the production of an inverse multiple nozzle of the type of construction shown in FIGURE 3 according to the method of construction of compound nozzles, FIGURES 14*a* and 14*b* are sectional views of two successive structural stages in a somewhat varied type of production of such a nozzle, FIGURES 15*a* and 15*b* are sectional views of two successive structural stages in the production of a filter cap with a coherent according to the method of construction of compound nozzles, FIGURE 16 is a sectional view of an inverse double nozzle with pipe section on a curved jacket tube, FIGURE 17 is a cross section taken on the line A—A of FIGURE 16, in the direction of the arrows, FIGURE 18 is a cross section taken on the line B—B of FIGURE 16, in the direction of the arrows, FIGURE 19 is a sectional view of an inverse double nozzle with two pipe sections on curved jacket tubes, FIGURE 20 is a sectional view of an inverse multiple nozzle with curved core tube and pipe sections on a straight jacket tube, FIGURES 21*a*, 21*b* and 21*c* are sectional views of successive structural stages in the production of an inverse multiple nozzle with pipe section and with centering elevations for the core nozzle, respectively, FIGURES 22*a*, 22*b* and 22*c* are cross sections of different successive structural stages taken on the line A—A of FIGURE 21*c*, in the direction of the arrows, FIGURE 23 is a sectional view of an inverse double nozzle with nozzle inlet section constructed as a fixed part, and FIGURES 24, 25 and 26 are sectional views of inverse double nozzles with bent jacket tube and exchangeable core nozzle inserted bodies as well as filter caps.

The double nozzles shown in FIGS. 1–3 may consist chiefly of composite individual parts soldered together. For example it is possible for the core tube 1 to be hard soldered at the point of passage through the jacket tube 2.

On the other hand, spinning heads have proven satisfactory wherein the multiple nozzles were produced according to the principles of making compound nozzles (FIGS. 13 and 14). According to a basic method of producing this type the inside tube or tubes are inserted in an auxiliary substance, the surface of which acquires the internal form of the jacket tube and subsequently is coated with a film or covering which after removal of the internal auxiliary substance forms the jacket tube. By providing depressions in the auxiliary substance the possibility is present of carrying the coating forming the jacket tube in places as far as the inside tube or tubes so that at these places a connection of homogeneous material bridging over the ring-shaped channel formed in the removal of the auxiliary substance, is produced which effects the centering of the inside tube or tubes. FIGURE 1 shows such a bulge 3 of the jacket tube with a connection of homogeneous material with the inner core nozzle tube.

In FIGURE 2 the cam-like bulge 4 is worked into the material of the core nozzle tube. Also this special case is possible since of course the jacket tube with its cam-like bulge is only formed subsequently. In this special case of FIGURE 2 there is in addition to the connection of homogeneous material, also a groove-like positive support of the core tube on the cam-like deformations of the jacket tube which project inward as a row of centering elevations of the jacket tube. Also merely by a laminar contact with an area of the surface of the inner tubes, even if in this contact surface area no depression is provided and the tubes are correspondingly separable from one another, an anchoring of the core tubes on the centering elevations can be produced which affords essentially higher safety against lateral displacement than a mere support but not anchored by the otherwise usual supporting means. Such a contact with the centering elevations, positively adapted to surface areas of limited extent, close fitting and thereby adhesion is obtained particularly favorably by the method of production mentioned according to the German Patent No. 1,047,984.

In the drawings of several centering elevations of a tube necessary for centering only one is shown, but in practice normally three such elevations for holding a single tube are neded. This is apparent, for example, from the cross sections of FIGURES 17 and 18.

The subsequent construction of a jacket tube on an auxiliary substance can be carried out by electrolytic procedures, by sintering a pulverulent material, by high vacuum vaporization, by metal spraying, by metal condensation or by other methods of coating.

Analogously it is possible to make a complex multiple nozzle composed of a plurality of units as in FIG. 4 with the methods of the compound nozzle production art. The inside space connecting the individual multiple nozzles 5 of the jacket tube common for several core nozzles is first formed from an auxiliary substance to be later removed on which the external film or covering of the finished body is subsequently applied.

In FIGS. 5 and 6 the spinning heads have no actual fused spinning feeding space with its own upper closing wall for the outer component. This space designated by 20 is rather automatically closed by the screw threaded fitting 6. On the other hand the spinning component feeding space 21 for the inner spinning component is contained in the spinning head. Further FIGS. 5 and 6 are concerned with various packing means for the inverse multiple nozzles in the spinning head. FIG. 5 shows in the upper partition 7 of the core nozzle feeding space, individual nozzles soldered to rings 22 which in the lower partition plate 8 are packed by a sliding seat and additionally by a small flange 23 attached to the multiple nozzle. A similar method of packing is shown in FIG. 6, in which the individual nozzles are soldered to a sleeve previously soldered into the upper partition and by its S-shaped form differences in length at the flange 23 or a packing 24 if desired lying underneath can be equalized by elastic deformation.

FIGS. 7 and 8 show sections through a bundle of core tubes 9 and 10 filling the entire inside space of a single jacket tube 2. The inner core nozzle tubes are centered together by bead-like reinforcements 11. The bead-like reinforcements which may be arranged in one or more planes above one another have, besides the centering function, the purpose of imparting to the spinning component, a stream flowing through the jacket tube, thus causing a drop in pressure necessary for the uniform distribution of the spinning component shortly before the exit of the spinning component from the lower spinning nozzle opening. The beaded plane acts practically speaking as a pressure building resistance plane behind which, in the direction of flow, the external spinning component is uniformly distributed about the inner spinning component threads (for example gas channels) formed by the core tube bundle.

FIG. 9 shows an inverse double nozzle with an insertable auxiliary capillary section 12 regulating the flow and a small filter cap 13 secured thereto which is to prevent fouling in the case of gas conducting core nozzles.

In FIGS. 10 and 11 are shown inverse triple nozzles which can serve for the production of hollow filaments with two different spinning masses as jacket substances. In these cases the short stretch additional heating described in the vicinity of the outlet of the nozzles is particularly useful as is shown diagrammatically at 16 in FIG. 12. For the feeding of the two outer spinning masses there are provided tubes 14 and 15. Obviously the additional heating shown in FIG. 12 is also applicable for the two component filaments and even for more than three component filaments. The feeding spaces 14 and 15 which are shown as tubes constructed vertically to the inlet pipes to the jacket nozzle tubes contain additional devices, not shown, as suitable for additional heating means, heat insulations, means for producing conveying pressure, and the like.

As already mentioned, FIGS. 13*a* to 15*b* show methods of production according to the nature of the compound nozzle technique described in German Patent No. 1,047,984.

In FIG. 13*a*, the core tube 1, of nickel for example, is inserted in the auxiliary material 17, aluminum for example, and this auxiliary material 17, in particular in the region just in front of the subsequent nozzle outlet opening, is worked up to the requisite internal shape of the jacket tube 2 to be later produced.

FIGURE 13*b* shows the covered nozzle. After cutting this body along the lines 18 and 19 and dissolving the auxiliary material, by means of a caustic soda solution for instance, there will then be obtained the finished inverse multiple nozzle as shown in FIG. 3. However, it is also possible as shown in FIGS. 14*a* and 14*b* to provide a non-inverse individual compound nozzle 20 with a correspondingly shaped auxiliary material 17, to be later wrapped with removable protective casings 21 at the inlet opening of the inner tube and at the outlet opening of the non-inverse individual nozzle and to provide the places left free after the manner of FIG. 14 with an outer jacket 2.

As is readily apparent, the method of compound nozzle production permits an ideal construction of the inner space of the nozzle, in particular the region of the nozzle outlet opening, from a technical flow viewpoint, as by the negative shaping of the auxiliary substance any streamline internal shape of the jacket tube, for example of its inner centering elevations, any conducting surfaces, etc. can be produced.

In FIG. 15*a*, a body or plate 22', in particular made of sintered glass particles and which is porous, is placed between two auxiliary substances 23' and the entire structure as in FIG. 15*b* is coated with an outside covering or film 24'. If this coating is done electrolytically for example and the body 22', for instance, is made of sintered glass, then the latter will suitably receive a conductive coating 25 by metallic high vacuum vaporization. When the outer covering is separated at the cut indications 26 and 27 and the auxiliary material 23 dissolved, the filter cap is finished. This sintered body 22' serves as a filter for removing dust and other undersized particles from the spinning material.

FIG. 16 shows an inverse double nozzle in which the core nozzle 1 is guided by a pipe section 28 through the curved jacket tube. FIG. 19 shows the same for a triple nozzle and FIG. 20 a variant of the double nozzle in which in contrast to FIGS. 16 and 19 the curved core tube is guided through a straight jacket tube. The pipe sections in FIG. 19 are here designated by the numerals 28 and 28' and the core tubes by 1 and 1'. The core tubes are packed tight in the pipe sections, in particular they are soldered at 29 and 29' respectively.

A further feature of the nozzle form also comprises the elevations or projections 30, 31, 30' and 31' of the surface of nozzle parts lying farther outside and projecting into the interior in the region of the nozzle opening of centrally placed nozzle parts and which are radially centered.

The nozzle forms shown in FIGS. 1 to 3 can be connected by the methods already described in spinning mass feeding spaces or may also be used for charging with bars of fusible material. As already described, the nozzle bodies may be heated at zones, specifically in their outlet region where a short stretch heating is obtained at a temperature which corresponds to the most favorable spinning temperature. The latter is especially necessary in the case of easily heated materials such as polyvinyl chloride, cellulose acetate, etc. also advantageously in the spinning of glass as here in the case of such a construction according to the invention the strength of the nozzle materials needs to be particularly high only in the forward part of the spinning opening, that is in the hottest zone.

In some cases such spinning heads have proven satisfactory in which multiple nozzles provided with pipe sections for the purpose of supporting the core tubes on the jacket tubes are provided with inwardly projecting centering elevations which are produced by shaping a negatively produced counter mold body, whereupon the counter mold body is destroyed by chemical or physical action, for example dissolved.

In FIGS. 21*a*, 21*b*, and 21*c*, an auxiliary body is shown which is the preliminary stage in the production of the nozzle as shown in FIG. 16. It consists of a metal wire 32 produced by turning and milling which is bent in its upper part and is provided with a circular wire shaped attachment 33 which advantageously was subsequently set in the metal wire 32. As already mentioned the whole unit may consist of aluminum which is electrolytically coated with nickel and then removed by a caustic soda solution.

In particular there are now formed centering elevations or projections 30, 31, 30', 31', FIGS. 16, 19 and 20, produced by negative shaping and subsequent layer formation so that they can center merely an internally placed nozzle body of smaller dimension than required. They will then, as already described, by subsequent mechanical treatment reduced to the desired internal diameter as is apparent from the cross sectional views of FIGS. 22*a*, 22*b* and 22*c*.

FIG. 21*b* shows the front part of the auxiliary body of FIG. 21*a* expanded in this respect for the subsequent outlet section of the nozzle jacket tube.

FIG. 21*c* shows this auxiliary body covered with the actual nozzle body coating 2. The separating line 34 indicates the surface where the nozzle body is cut off at the end and it represents, therefore, the lower surface of the actual nozzle outlet opening. The space 35 is the drilling sleeve through which, in particular after the dissolving of the auxiliary body 32 a tool, for instance a drill, can be introduced and guided which expands the lower inside width of the centering elevations 30 and 31 to the proper amount.

FIG. 22*a* shows a section through the centering elevations 31 before the expansion, FIG. 22*b* the same after expansion, and FIG. 22*c* the same section after introduction of the core nozzle tube 1 pushed through the pipe section 28, FIG. 16. One proceeds analogously in the calibration of centering elevations 30, 31, 30', 31' for more than two stage nozzles, the inside diameter of which is produced below standards.

By the installation of pipe sections there is obtained a further advantage, namely that in the zone heating of the nozzles, in particular in the case of such in which only the nozzle mouth is brought to the spinning temperature, the temperatures in the vicinity of the soldered places 29 and 29' lie relatively low or may be kept low so that at these places, solders with a low melting temperature may be used.

FIG. 23 shows a variant of the described nozzles in which the nozzle jacket tube carrying the pipe section 28 is constructed not as the actual nozzle but only as a receiving part 2' for a nozzle 2'' and the latter is soldered at the places 29 and 29'. It is a matter here either of a composite nozzle or specifically of a compound nozzle as in German Patent No. 1,047,984.

FIGS. 24, 25 and 26 show as an example a compound nozzle as in the German Patent No. 1,047,984 of which three types of exchangeable insert bodies are formed constricting the flow cross section. In FIG. 24 it is a question of a hollow needle with upper positioned orienting collar; FIG. 25 shows a wire introduced into the interior of the gas conveying core nozzle canule, the upper end of which is bent around for the purpose of fixing in position; and FIG. 26 shows finally the same case as FIG. 25 with the change merely that the lower end of the inserted body constructed as a profile wire with, for example, triangular cross section is withdrawn somewhat into the nozzle and the upper end is not bent around or flanged.

The dotted lines, FIGS. 24, 25 and 26, indicate the cohering surfaces of filter caps which are intended to prevent a fouling of the canules.

It has been established that the hollow needles in the canules are held sufficiently tight enough by the great frictional resistance on the inside surface of the canules so that advantageously (in a manner not shown) the upper collar or band is omitted. In this way the hollow needles can also be replaced from the outlet opening. In the same way it is possible, as shown in FIG. 26, to avoid the upper support in the case of inserted wires also, for example the bending of their upper part, if profile wires, preferably of triangular cross section, are used. Also they can easily be introduced and removed from the outlet opening, and they are particularly easy to clean.

We claim the following:

1. A spinning head having a front plate and individual inverse multiple nozzles inserted in said front plate, comprising a core nozzle having a central channel and at least one ring nozzle consisting of a jacket tube surrounding the core nozzle to form an annular channel, and means for forming separate feeding spaces for the spinning materials fed through the individual nozzles of the inverse multiple nozzles, the core tube being directed to the outside through the jacket tube of the ring nozzle, and the feeding space for the core nozzles joining directly at the front plate so that the feeding spaces for the ring nozzles are separated from said front plate by the feeding space for the core nozzles.

2. A spinning head according to claim 1, in which the jacket tubes of the inverse multiple nozzles surrounding the core tubes are provided as bent in S-shape.

3. A spinning head according to claim 1, in which the wall of the jacket tubes have pipe sections which support the core tubes passing through them and being packed.

4. A spinning head according to claim 3, in which the core tubes are soldered in the pipe sections.

5. A spinning head according to claim 1, in which the inverse multiple nozzles have a heating device in the vicinity of said front plate.

6. A spinning head according to claim 1, in which the core nozzles for regulating the feeding pressure for gaseous media are provided with insert bodies constricting the channel cross section.

7. A spinning head according to claim 1, in which the core nozzles for regulating the feeding pressure or gaseous media are provided with insert bodies constricting the channel cross section, with each insert body consisting of at least one wire provided with flat wire bent at the upper end exchangeable from the nozzle inlet openings.

8. A spinning head according to claim 1, in which said jacket tube surrounding a core nozzle consists of two pipe sections united in fluid tight manner and adjoining one another axially and being inserted in one another for a distance of which one extends to said front plate in which the front end of the core nozzle is centered and the other is a passage tube for said core tube part directed to the outside through the jacket tube and inserted therein in fluid tight connection.

References Cited by the Examiner

UNITED STATES PATENTS

| | | | |
|---|---|---|---|
| 2,360,680 | 10/44 | Holzmann | 18—8 |
| 3,075,241 | 1/63 | Dietzsch et al. | 18—8 |
| 3,081,490 | 3/63 | Heymen et al. | 18—8 |

FOREIGN PATENTS

| | | |
|---|---|---|
| 583,706 | 9/59 | Canada. |
| 1,153,265 | 9/57 | France. |

WILLIAM J. STEPHENSON, *Primary Examiner.*

MICHAEL V. BRINDISI, *Examiner.*